March 12, 1940.  J. P. MINTON  2,193,769
FREQUENCY MULTIPLICATION SYSTEM FOR SEISMIC RECORDING
Filed Dec. 16, 1937  2 Sheets-Sheet 1
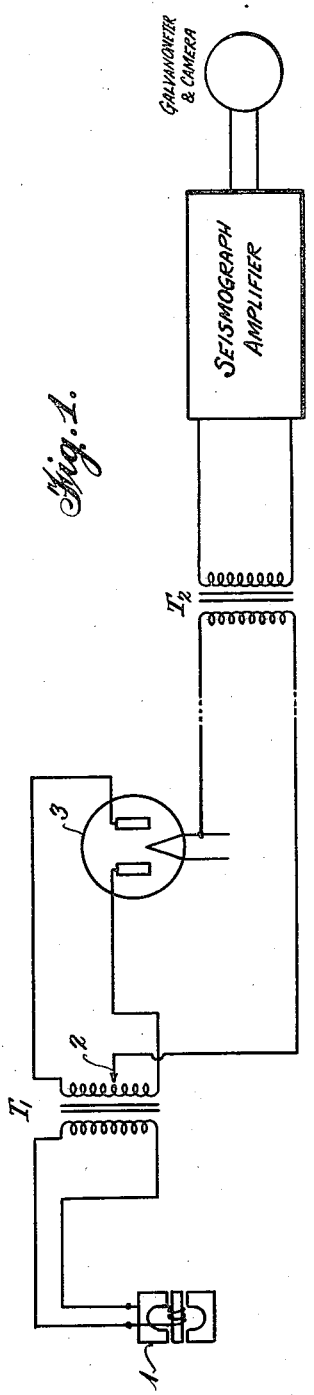
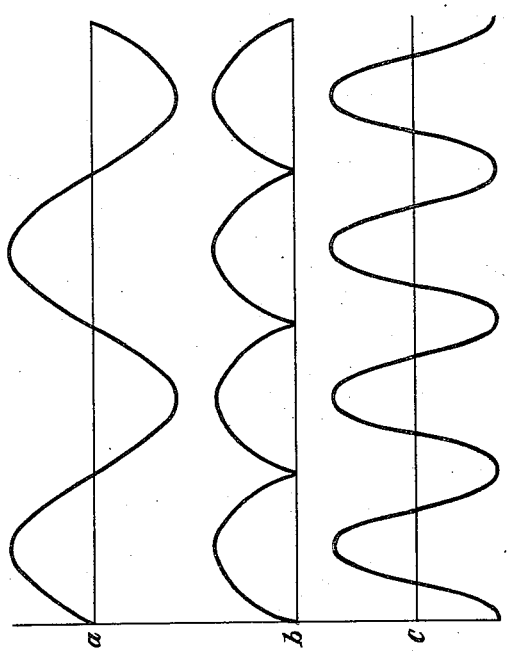
Inventor
John P. Minton
By Dallas R. Lamont
Attorney March 12, 1940.  J. P. MINTON  2,193,769
FREQUENCY MULTIPLICATION SYSTEM FOR SEISMIC RECORDING
Filed Dec. 16, 1937   2 Sheets-Sheet 2
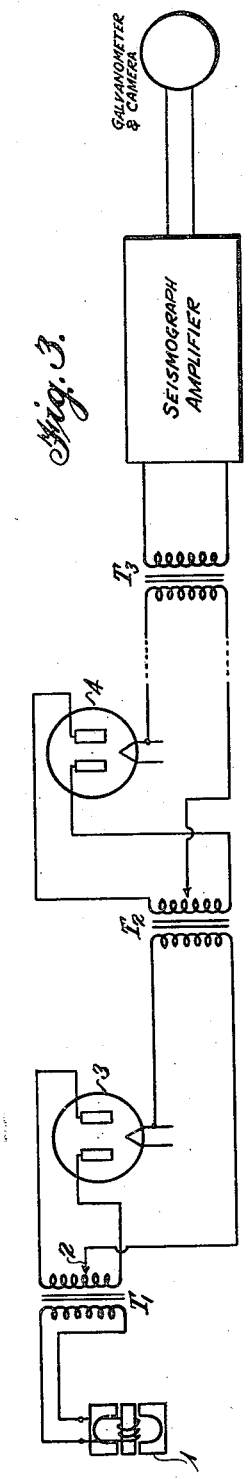
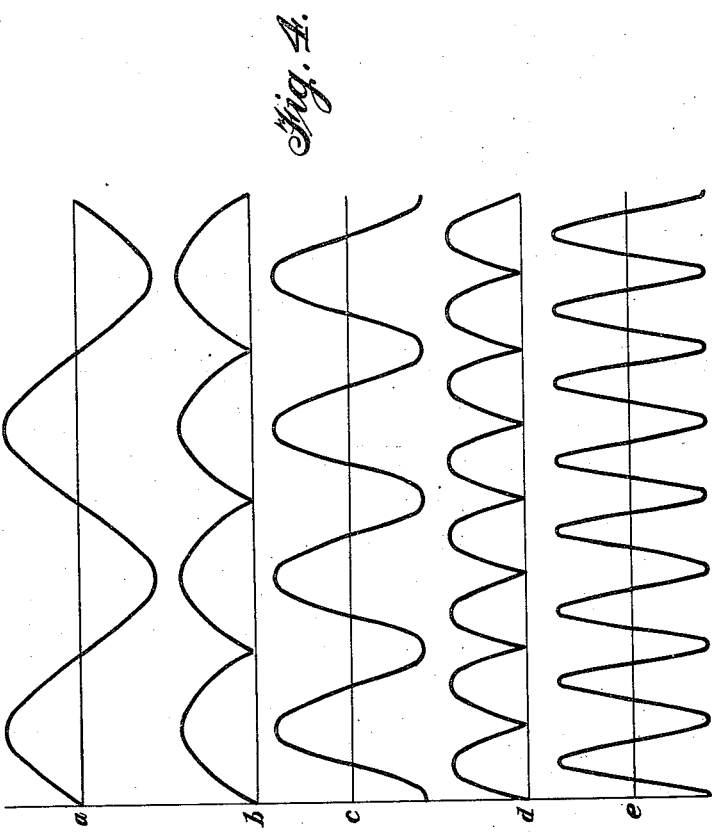
Inventor
John P. Minton
By Dallas R. Lamont
Attorney Patented Mar. 12, 1940

2,193,769

UNITED STATES PATENT OFFICE 2,193,769

FREQUENCY MULTIPLICATION SYSTEM FOR SEISMIC RECORDING

John P. Minton, Dallas, Tex., assignor, by mesne assignments, to Socony-Vacuum Oil Company, Incorporated, New York, N. Y., a corporation of New York Application December 16, 1937, Serial No. 180,114

1 Claim. (Cl. 177—352)

This invention relates generally to a method and apparatus for recording seismic waves which have been produced by detonating a charge of explosives at or near the earth's surface and more particularly has reference to a method and apparatus for discriminating between low frequency surface traveling waves referred to in the art as "ground roll" and the higher frequency waves such as those which have been reflected from successive strata in the earth's surface.

Numerous methods for accomplishing this result have been suggested heretofore but they have not proven entirely satisfactory. The most common of these are the methods disclosed in the patents to Hayes and Taylor. They propose the spacing of geophones in a manner, relative to the shot point, that will permit algebraic cancellation of the ground roll frequencies and at the same time permit the addition of the frequencies of reflected waves. These systems are ones of purely algebraic cancellation and addition.

The multiplication system, forming the subject matter of this application, permits of the multiplication of the frequencies of the ground disturbances and the recording of these higher frequencies in the seismograms. This system is not one which is based on algebraic recording of the disturbances at the various geophones but is a system which permits of the multiplication of the frequencies of all the disturbances up to the so-called audio range and then discriminating between them with electrical networks in the seismograph amplifier against unwanted frequencies. For example, if one assumes that the major frequencies of which the "ground roll" is composed are in the region of 20 cycles and the major frequencies of which reflected waves are composed are in the region of 50 cycles, then if these frequencies are multiplied say as much as four times, the "ground roll" disturbances will be in the region of 80 cycles and the reflected wave frequencies will be in the region of 200 cycles. With the apparatus disclosed in this application, it is possible to multiply these frequencies as many times as is found desirable. Each time the frequencies of the detected waves are multiplied, the "ground roll" frequencies which are troublesome become further away from the reflected wave frequencies, thereby making it possible to more easily discriminate between the two groups.

Inductances are used in the amplifier for purpose of discriminating between these frequencies. These inductances perform much more satisfactorily in these higher frequency regions than they do in the low frequency regions. This accounts for the difficulty encountered in discriminating between these two types of waves in a frequency range of 20 to 50 cycles. Whereas if a frequency range of 150 to 400 cycles is dealt with, the inductances can be used with success. In the application of this invention, it is of importance that the frequencies comprising a reflected wave band be passed through the amplifier at the same velocity. In other words the phase characteristic over the important frequency band should be a linear function of frequency. This would simplify the design of electrical equipment. The recorded reflected waves under such conditions would look materially different from those that are being recorded with the conventional electric seismograph equipment.

When dealing with frequencies in this higher range one is not confronted with the possibility of errors in picking the legs of the reflected waves. Additionally, there is a possibility of decreasing the build up time of the reflected waves very materially and thereby increasing the accuracy with which one can pick the beginning of these various reflected waves.

Therefore the principal object of this invention is in the provision of a method and apparatus whereby the frequencies of detected seismic waves can be multiplied to permit greater discrimination between waves of selected frequencies.

Another object of this invention is in the provision of a unit which may be built as an integral part of a seismograph amplifier or as a separate unit.

This invention further contemplates the provision of apparatus which is sufficiently flexible that any selected number of stages can be used in connection with a conventional amplifier.

Other objects and advantages will become apparent from the following detailed description, when considered with the attached drawings, in which:

Figure 1 is a diagrammatic illustration of an electric seismograph showing the use of a single rectifying or frequency doubling stage;

Figure 2 is a group of curves illustrating the manner in which the frequency of a fundamental wave is doubled;

Figure 3 is a diagrammatic illustration of an electric seismograph circuit disclosing the use of two rectifying or frequency multiplying stages; and Figure 4 is a group of curves showing a fundamental wave and the manner in which its frequency is doubled twice.

Referring to the drawings in detail particularly Figure 1, there is shown a diagrammatic circuit of an electric seismograph having one stage of frequency multiplication. A geophone 1 is connected to the input of a transformer $T_1$ of the type having a center secondary winding tap 2. The secondary winding of this transformer is then connected to the input of a full wave rectifying tube 3 of the type identified on the market as "280". Assuming that a fundamental wave such as that shown in Figure 2a is passed through the transformer $T_1$ then the output of the full wave rectified tube 3 which is impressed on the primary winding of the transformer $T_2$ will appear as shown in Figure 2b. The output wave from the transformer $T_2$ will, however, have the appearance of the wave illustrated in Figure 2c. By comparing these waves as illustrated in Figure 2, it will be noted that the frequency of the fundamental has been exactly doubled.

In Figure 3 there is shown a diagrammatic circuit of an electric seismograph employing two stages of frequency multiplication. The first stage is identical with that shown in Figure 1. In this circuit the output of the transformer $T_2$ is passed through a second rectifying tube 4 which will, in the manner described in connection with tube 3, double the frequency of all the waves passing through it. Assuming that a fundamental wave such as illustrated in Figure 4a is passed through the tube 3, then the input wave to the transformer $T_2$ would appear as shown in Figure 4b. Then the output wave from the transformer $T_2$, having the appearance of the wave shown in Figure 4c, is passed through the tube 4 giving a wave that will be impressed upon the primary winding of the transformer $T_3$ that will have the appearance of that shown in Figure 4d. This wave will have four times the frequency of the fundamental. The wave from the output of the transformer $T_3$ that is introduced to the seismograph amplifier will be of the character illustrated in Figure 4e.

From the above, it becomes obvious that by using any desired number of multiplication stages the frequencies of the waves from the geophone can be doubled as many times as is found desirable to effect proper discrimination between selected wave bands.

By doubling the frequencies of the seismic waves, frequencies are obtained which are substantially higher than those normally recorded in seismic survey work and as a result filtering net-works can be used in the respective amplifiers that will readily function to eliminate undesirable frequencies.

The transformers $T_1$, $T_2$, and $T_3$ should be selected such that they will not introduce any substantial phase error for the reflection frequencies. Their characteristics should additionally be such that they will introduce no frequency distortion for the reflection frequencies.

Although the invention has been described above in connection with the use of a full wave rectifier tube, any kind of a rectifying device would be satisfactory so long as it will rectify at the voltages that are encountered. In addition to the use of rectifying devices, any other non-linear devices that will generate the higher harmonics of the fundamental can be used.

Additionally, although the description of this invention has been directed to a single amplifier, in actual practice a multiplying system such as that described above is used in connection with each amplifier.

I claim:

In a device for geophysical prospecting in which means are provided to generate seismic waves and additional means are provided to detect them after they have passed through a portion of the earth and amplify and record them, the improvement that comprises a frequency multiplying circuit connected so as to multiply the frequency of the detected waves, and a filter circuit connected to exclude the multiplied ground roll waves from the recorder.

JOHN P. MINTON.